United States Patent Office 3,228,548
Patented Jan. 11, 1966

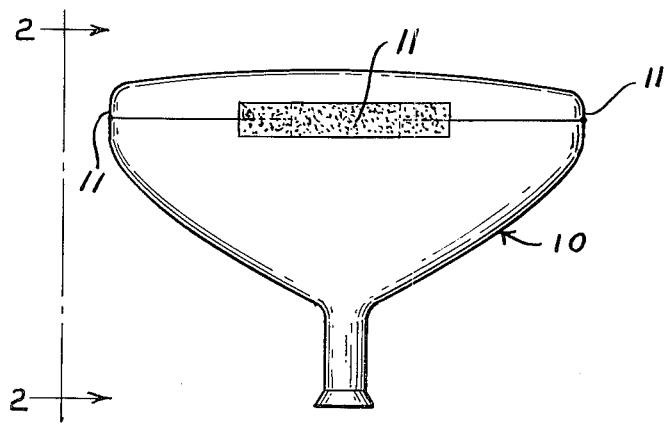
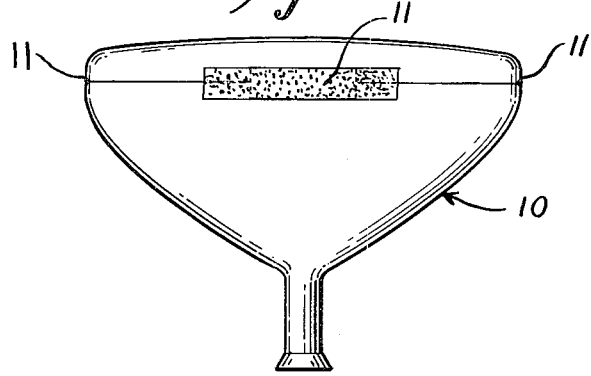

3,228,548
STRENGTHENED CATHODE RAY TUBE
Miles F. Butler, Corning, N.Y., assignor to Corning Glass Works, Corning, N.Y., a corporation of New York
Filed Jan. 10, 1962, Ser. No. 165,385
2 Claims. (Cl. 220—2.1)

This invention relates to strengthening glass articles by the application of coatings thereto.

It is well known that the strength of glass articles can be increased by increasing the thicknesses thereof. In many instances, however, it is impractical to increase the thicknesses of such articles due to resultant increases in weight and bulk, and for this reason the desirability of producing thin coatings having the ability to add strength is apparent.

It is well known that fractures in glass bodies result from tensile components of stress, and it is generally believed that such fractures originate in small imperfections in the glass, many of which are found in the glass surface and result from impact between the glass body and other hard bodies. It is believed that such imperfections, which may be so small as to be invisible under a microscope, cause stress concentrations which lead to fracture.

Consequently, the desirability of producing a coating which is able both to prevent the occurrence of surface imperfections in a glass body and at the same time to minimize tensile stresses at the surface of the body becomes apparent.

It is an object of this invention to provide such a coating.

It is a further object to provide a coating which may be applied to selected portions of the surface of a glass article, and to provide a method for strengthening such an article by the application of such a coating to selected areas.

These objects are accomplished by the provision of a coating comprising a devitrified glass having its softening temperature and, preferably, its coefficient of expansion lower than the corresponding values for the base glass and having particles of a refractory substance intermingled therewith.

Devitrifiable glasses are well known and are disclosed, for example, as glass sealing means in U.S. Patent 2,889,-952, issued to S. A. Claypoole. Reference may be made to this patent for a description of the properties and methods of application of such glasses. The present applicant has discovered that such glasses can be used in combination with various refractory materials as coatings to give greatly increased strength to glass articles. The added refractory materials serve both to give increased abrasion resistance and to lower the coefficient of expansion of the coatings.

For purposes of illustration only, the invention will be described as embodied in a coated cathode ray tube of the type conventionally used in television receivers. It will be apparent that the invention is equally applicable to other glass articles. Such embodiment is illustrated in the drawing, in which:

FIG. 1 represents a cathode ray tube having a coating according to the invention deposited on selected portions thereof, and FIG. 2 is a view taken on line 2—2 of FIG. 1.

Experience has shown that when a cathode ray tube of the illustrated shape is evacuated, certain portions of the outer surface thereof tend to go into tension. These portions lie generally in the area of the seal between the funnel and the faceplate and are greatest at positions corresponding to the ends of the two axes of the faceplate. Accordingly, it has been found that substantial increases in strength can be attained by covering the outer surfaces of these portions with a coating made in accordance with the present invention.

As a preferred embodiment of the invention, the following coating and method is described:

A glass comprising approximately 76.5% PbO, 11% ZnO, 9.1% $B_2O_3$, 2.4% $SiO_2$ and 1% $Al_2O_3$ was ground to a powder capable of passing through a 100 mesh screen. Quantities of both milled zircon (zirconium silicate) and mineral petalite (lithium aluminum silicate) were ground until they were able to pass through a 325 mesh screen. These powders were then thoroughly blended in the weight proportions of 70 parts glass, 25 parts milled zircon and 5 parts mineral petalite.

Next, a solution was made comprising 10% by weight Carbowax 6000 (polyethylene glycol having a molecular weight of 6000) and 90% by weight water, and a slurry was formed by combining two parts by weight of the blended powder with one part by weight of the solution. The slurry was then sprayed on the illustrated portions 11 of cathode ray tube 10, and the coated tube was raised from room temperature to 440° C. at the rate of 10° C. per minute, held at that temperature for 1 hour to form a seal and to effect devitrification of the glass component of the coating and then returned to room temperature at the rate of 5° C. per minute. During the heating cycle the water and Carbowax are removed, and the glass of the coating softens, seals to the base glass and devitrifies.

A coating made by this process has a coefficient of expansion of approximately $65 \times 10^{-7}$ per ° C., while that of the devitrified glass itself is approximately $100 \times 10^{-7}$ per ° C. Thus, the addition of the refractory materials to the devitrifiable glass serves to increase resistance to both impact and abrasion and to decrease the coefficient of expansion, thereby increasing the degree of compression in the coating. Coatings may vary in thickness within the preferable range approximately .001–0.25 inch.

The addition of such a coating to a conventional 23″ television picture tube has resulted in increases in resistance to breakage under pressure ranging between 40 and 50%.

It will be understood that the invention is not limited to the particular devitrifiable glass compositions disclosed or to the particular refractory abrasives added thereto. All devitrifiable glasses within the scope of the abovementioned Claypoole patent are suitable, and other abrasives may be used, for example, silicon carbide and aluminum silicate. The proportions of the components may be varied either to vary resistance to abrasion or to vary the degree of compression in the coating, greater amounts of the refractory components generally giving lower coefficients of expansion.

It will be understood that glass objects of diverse shapes generally are subject to failure at differing locations, and for this reason the present invention contemplates placing a coating of the type disclosed either at such weak spots or over the entire surface of an article if exceptionally high breakage resistance is required.

I claim:
1. In a cathode ray tube comprising a funnel and a substantially rectangular face plate sealed thereto, the improvement which comprises a coating on the outer surface of said tube, said coating comprising a devitrified glass having intermingled therewith a quantity of finely divided refractory material, said coating being applied in four areas, said areas being located substantially along the intersection between said funnel and said face plate and in positions corresponding generally to the centers of the sides of said rectangular face plate.

2. In a cathode ray tube comprising a funnel and a substantially rectangular face plate sealed thereto, the improvement which comprises a coating upon the outer surface of said tube, said coating comprising a devitrified glass having intermingled therewith a quantity of finely-divided refractory material, said coating being in compression and being applied only in four separate areas, said areas being located substantially along the intersection between said funnel and said face plate and at positions corresponding generally to the centers of the sides of said rectangular face plate.

References Cited by the Examiner

UNITED STATES PATENTS

| | | | |
|---|---|---|---|
| 2,785,820 | 2/1957 | Vincent | 220—2.1 |
| 2,889,952 | 6/1959 | Claypoole | 220—2.1 |
| 2,920,971 | 1/1960 | Stookey | 65—33 X |
| 2,960,801 | 11/1960 | King et al. | 65—33 |
| 2,960,802 | 11/1960 | Voss | 65—33 |
| 2,998,675 | 9/1961 | Olcott | 65—33 |
| 3,061,664 | 10/1962 | Kegg | 65—43 X |
| 3,071,280 | 1/1963 | Mayhew et al. | 220—2.1 |
| 3,113,878 | 12/1963 | Martin | 65—33 |
| 3,117,881 | 1/1964 | Henry | 65—33 |

LOUIS G. MANCENE, *Acting Primary Examiner.*

EARLE J. DRUMMOND, THERON E. CONDON,
*Examiners.*